(12) United States Patent
Reed

(10) Patent No.: US 7,181,913 B1
(45) Date of Patent: Feb. 27, 2007

(54) STEAM-GENERATING DRIVE SYSTEM

(76) Inventor: Jed A. Reed, 121 Franklin Ave., Apt. E, Indialantic, FL (US) 32903

( * ) Notice: Subject to any disclaimer, the term of this patent is extended or adjusted under 35 U.S.C. 154(b) by 0 days.

(21) Appl. No.: 11/124,441

(22) Filed: May 6, 2005

(51) Int. Cl.
*F01K 23/10* (2006.01)

(52) U.S. Cl. .......................... 60/618; 60/619

(58) Field of Classification Search ............... 60/614, 60/616, 618, 619
See application file for complete search history.

(56) References Cited

U.S. PATENT DOCUMENTS

| | | | | |
|---|---|---|---|---|
| 2,791,881 A | * | 5/1957 | Denker | 60/619 |
| 4,406,127 A | * | 9/1983 | Dunn | 60/618 |
| 4,590,766 A | * | 5/1986 | Striebich | 60/618 |
| 4,901,531 A | * | 2/1990 | Kubo et al. | 60/618 |
| 5,896,746 A | * | 4/1999 | Platell | 60/618 |
| 2003/0005696 A1 | * | 1/2003 | Wilson | 60/618 |

* cited by examiner

Primary Examiner—Hoang Nguyen

(57) ABSTRACT

A steam-generating drive system is disclosed. The steam-generating drive system includes an internal combustion engine having an exhaust outlet chamber. A steam reservoir is provided in fluid communication with the exhaust outlet chamber for receiving exhaust gases from the exhaust outlet chamber. A water injector is provided in fluid communication with the steam reservoir for injecting water into the steam reservoir such that high-pressure steam is generated in the steam reservoir.

16 Claims, 4 Drawing Sheets

STEAM-GENERATING DRIVE SYSTEM

FIELD OF THE INVENTION

The present invention relates to apparatus which generate steam from exhaust gases. More particularly, the present invention relates to a steam-generating drive system which captures high-pressure exhaust gases from an internal combustion engine and injects water into the exhaust gases to generate high-pressure steam.

BACKGROUND OF THE INVENTION

Various steam-generating systems which utilize waste heat generated by internal combustion engines are known. Typically, such systems utilize the hot combustion exhaust emitted from the cylinder of an engine to heat a reservoir of liquid water in order to generate steam. The generated steam is distributed to a steam turbine or other apparatus that converts the steam to power, thus supplementing the output of the engine.

There is a need for a steam-generating drive system which generates high-pressure steam from exhaust gases emitted by an internal combustion engine.

SUMMARY OF THE INVENTION

The present invention is generally directed to a steam-generating drive system. The steam-generating drive system includes an internal combustion engine having an exhaust outlet chamber. A steam reservoir is provided in fluid communication with the exhaust outlet chamber for receiving exhaust gases from the exhaust outlet chamber. A water injector is provided in fluid communication with the steam reservoir for injecting water into the steam reservoir such that high-pressure steam is generated in the steam reservoir.

BRIEF DESCRIPTION OF THE DRAWINGS

The invention will now be described, by way of example, with reference to the accompanying drawings, in which.

DETAILED DESCRIPTION OF THE INVENTION

Figure 1:
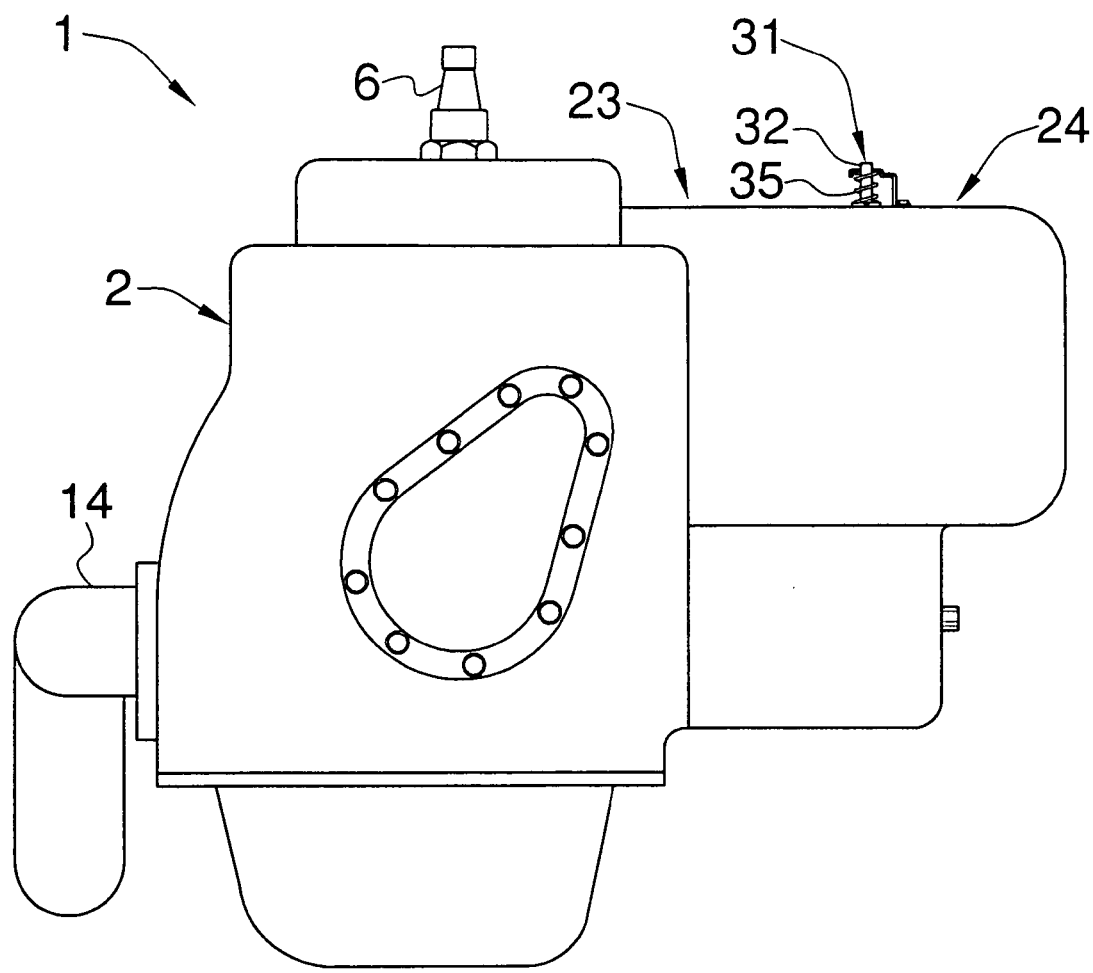
FIG. 1 is a side view of an illustrative embodiment of the steam-generating drive system according to the present invention.

Referring to the drawings, an illustrative embodiment of the steam-generating drive system, hereinafter system, of the present invention is generally indicated by reference numeral 1. Briefly, the system 1 is designed to generate high-pressure steam using exhaust gases generated from an internal combustion engine. The high-pressure steam may be used to rotate a steam turbine which generates electrical power for a desired purpose. For example, the system 1 may be used to generate steam-generated electricity for marine applications.

Figure 2:
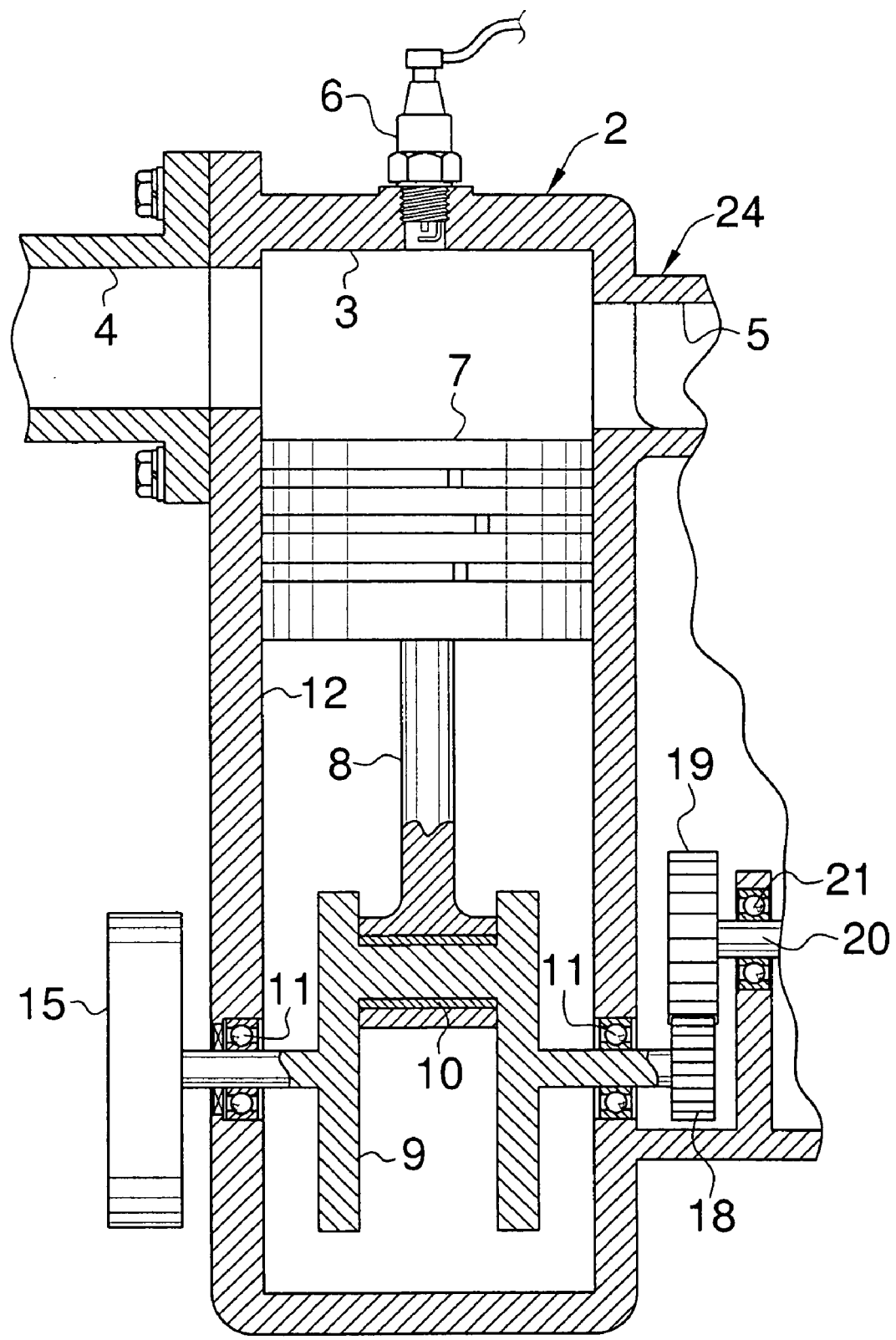
FIG. 2 is a cross-sectional view of the piston, cylinder and combustion chamber elements of an illustrative embodiment of the steam-generating drive system according to the present invention.

The system 1 includes an internal combustion engine 2 which may be a conventional four-stroke engine having a cylinder 12 and a combustion chamber 3 in the upper end of the combustion chamber 12, as shown in FIG. 2. A gas inlet 4 is connected to the combustion chamber 12. A spark plug 6 is provided in the combustion chamber 3 for igniting vaporized gas in the combustion chamber 3. The system 1 includes a sequence of operation that allows for normal 4-cycle functioning of the internal combustion engine 2.

A crankshaft 9 is rotatably mounted in a pair of bearings 11 provided in opposite walls of the cylinder 12. A rotatable bushing 10 eccentrically engages the crankshaft 9. A piston 7 is slidably mounted in the cylinder 12 for reciprocation therein above the crankshaft 9. The piston 7 includes a piston shaft 8, the lower end of which engages the bushing 10. Accordingly, the piston 7 is adapted to reciprocate in the cylinder 12 and rotate the crankshaft 9 responsive to repeated combustion of vaporized gases in the combustion chamber 3, in conventional fashion. Outside the cylinder 12, a water pump 15, which is connected to a water intake 14 (FIG. 1), is coupled to the crankshaft 9 for purposes which will be hereinafter described.

Figure 3:
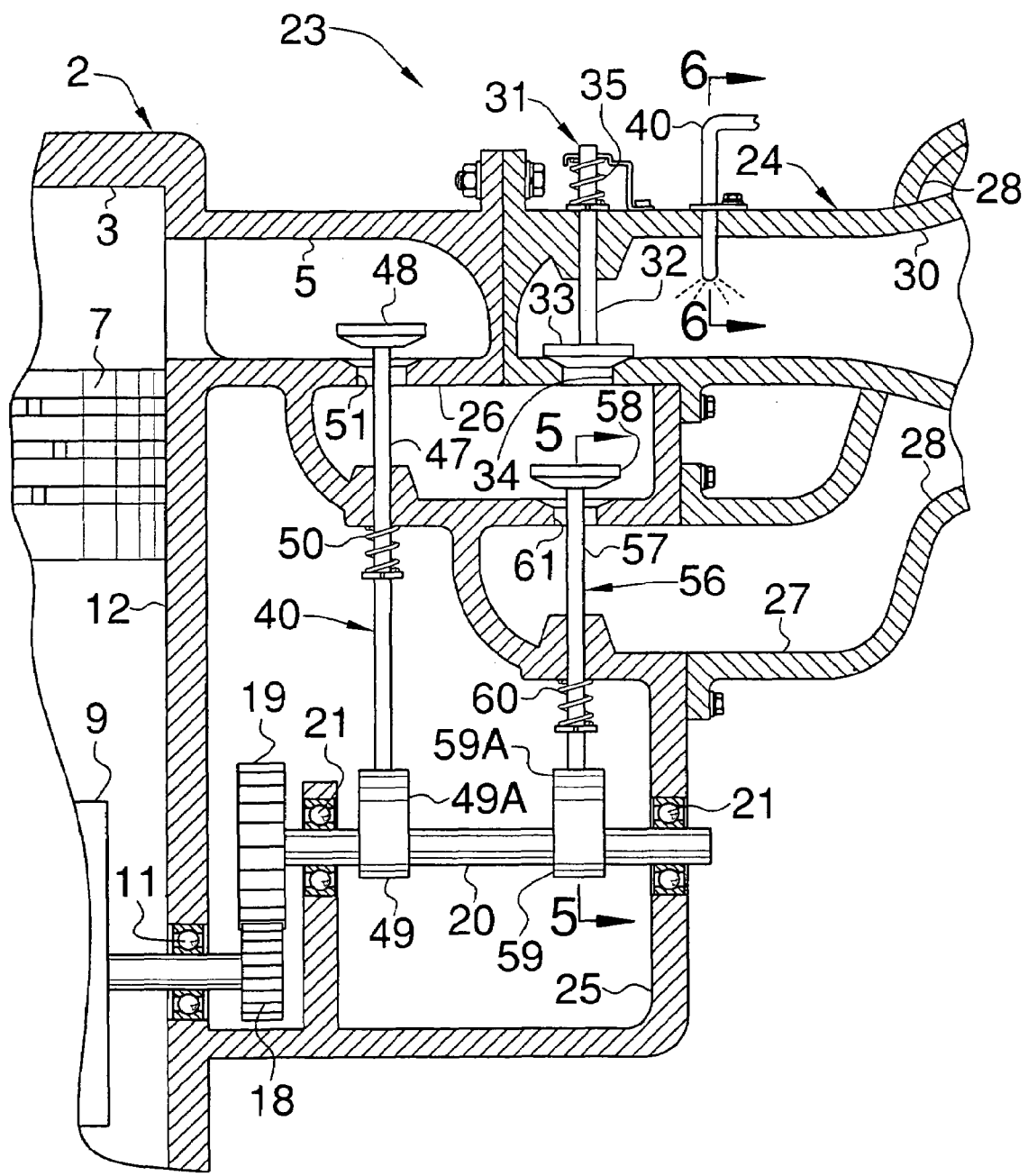
FIG. 3 is a cross-sectional view of a high-pressure steam generating exhaust train attached to the internal combustion engine of an illustrative embodiment of the steam-generating drive system according to the present invention.
Figure 4:
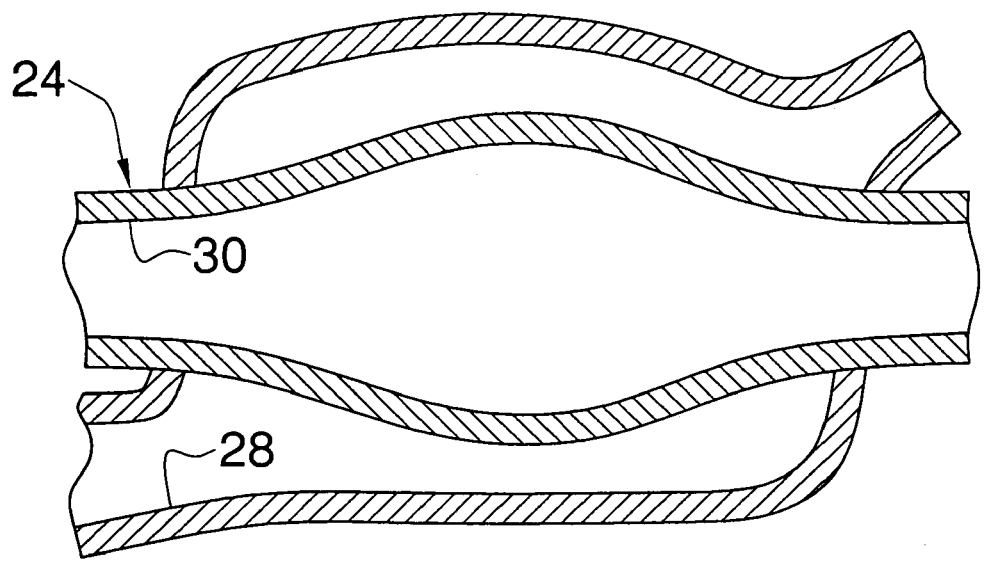
FIG. 4 is a cross-sectional view of a steam generation housing and heat exchanger provided in thermal contact with the steam generation housing in the high-pressure steam generating exhaust train.

As further shown in FIG. 1, the system 1 of the present invention further includes a high-pressure steam generating exhaust train 23 having a steam generation housing 24 which is attached to the internal combustion engine 2. As shown in FIG. 3, the steam generation housing 24 includes an exhaust outlet chamber 5 which is connected to the outlet of the combustion chamber 3. A high pressure exhaust chamber 26 may be confluently connected to the exhaust outlet chamber 5 through a valve opening 51. A low pressure exhaust chamber 27 is confluently connected to the high pressure exhaust chamber 26 through a valve opening 61. A heat exchanger 28, the purpose of which will be hereinafter described, is confluently connected to the low pressure exhaust chamber 27.

Figure 6:
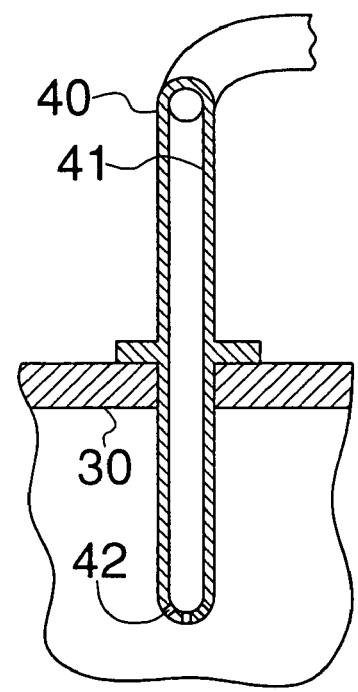
FIG. 6 is a cross-sectional view of a water injector tube for injecting water into the steam reservoir of the steam-generating drive system according to the present invention.

A steam reservoir 30 is confluently connected to the high pressure exhaust chamber 26 through an opening 34. The outlet end of the steam reservoir 30 is typically connected to a steam turbine (not shown) which generates electricity for any desired purpose. A poppet valve 31 includes a valve shaft 32 and a valve head 33 on the valve shaft 32. A spring 35 biases the poppet valve 31 in such a position that the valve head 33 normally seals the opening 34. Preferably, the spring 35 exerts a bias pressure which must be counterbalanced by a steam pressure of typically at least about 130 p.s.i. in the high pressure exhaust chamber 26 to unseat the valve head 33 from the opening 34. This corresponds to approximately 10 percent after top dead center on the combustion cycle. A water injector 40 extends from outside the steam generating housing 24, into the steam generator 30 for injecting water into the steam generator 30, as will be hereinafter further described. As shown in FIG. 6, the water injector 40 typically includes an injector interior 41 and one or multiple water-dispensing ports 42 in the end of the water injector 40. However, it will be understood that the water injector 40 may have alternative designs which are consistent with the use requirements of the invention. The water injector 40 is typically connected to the water pump 15 (FIG. 2) to facilitate pumping of water from the water intake 14 (FIG. 1) to the water injector 40 during operation of the internal combustion engine 2.

As further shown in FIG. 3, the steam generator housing 24 further includes a cam chamber 25 which is typically adjacent to the cylinder 12 of the internal combustion engine 2. The crankshaft 9 extends from the cylinder 12; through the bearing 11 in the wall of the cylinder 12, as heretofore noted; and into the cam chamber 25. A crankshaft gear 18 engages the crankshaft 9. A cam shaft 20 is rotatably mounted in a bearing 21 provided in the cam chamber 25. A cam shaft gear 19 is provided on the cam shaft 20 and meshes with the crankshaft gear 18. Accordingly, as the crankshaft 9 is rotated by the reciprocating piston 7, the crankshaft 9 in turn rotates the cam shaft 20 in the bearing 21 through the crankshaft gear 18 and cam shaft gear 19.

Figure 5:
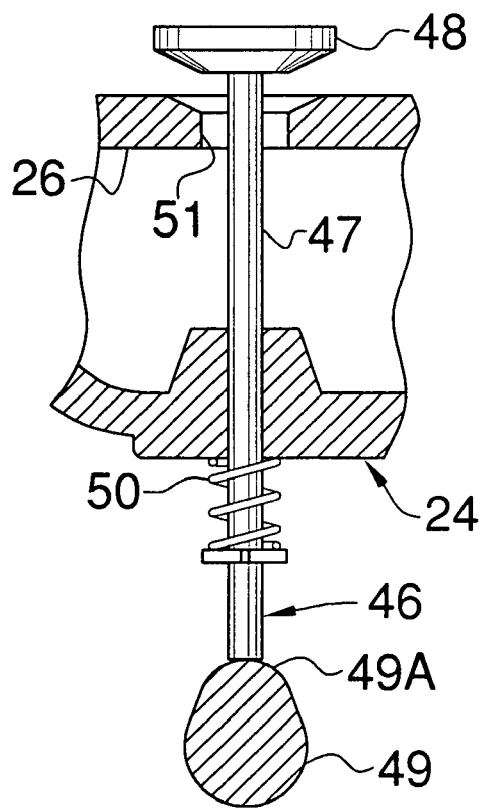
FIG. 5 is a cross-section of a valve which facilitates flow of medium-pressure and low-pressure exhaust from an exhaust outlet chamber of the internal combustion engine and into the heat exchanger.

As further shown in FIG. 3, a cam 49 having a cam lobe 49a and a cam 59 having a cam lobe 59a are mounted on the cam shaft 20. A valve 46 includes a valve shaft 47, the lower end of which engages the cam 49. The valve shaft 47 typically extends upwardly through the high pressure exhaust chamber 26, through the opening 51 and into the exhaust outlet chamber 5. A valve head 48 is provided on the upper end of the valve shaft 47, inside the exhaust outlet chamber 5. A spring 50 normally biases the valve 46 in such a manner that the valve head 48 seats in the valve opening 51 when the body of the cam 49 engages the valve shaft 47. When the cam shaft 20 rotates the cam 49 around such that the cam lobe 49a engages the lower end of the valve shaft 47, as shown in FIG. 5, the valve shaft 47 raises and unseats the valve head 48 from the valve opening 51, thereby establishing communication between the exhaust outlet chamber 5 and the high pressure exhaust chamber 26 for purposes which will be hereinafter described.

A valve 56 includes a valve shaft 57, the lower end of which engages the cam 59. The valve shaft 57 typically extends upwardly through the low pressure exhaust chamber 27 and into the high pressure exhaust chamber 26. A valve head 58 is provided on the upper end of the valve shaft 57, inside the high pressure exhaust chamber 26. A spring 60 normally biases the valve 56 in such a manner that the valve head 58 seats in the valve opening 61 when the body of the cam 59 engages the valve shaft 57. When the cam shaft 20 rotates the cam 59 around such that the cam lobe 59a engages the lower end of the valve shaft 57, as was heretofore described with respect to the valve 46 in FIG. 5, the valve shaft 57 raises and unseats the valve head 58 from the valve opening 61, thereby establishing communication between the high pressure exhaust chamber 26 and the low pressure exhaust chamber 27 for purposes which will be hereinafter described. Preferably, the valve 46 is designed to unseat the valve head 48 from the opening 51 at approximately 10 degrees after top dead center on the combustion cycle.

In operation of the system 1, the piston 7 reciprocates in the cylinder 12 as gases are introduced into the combustion chamber 3 from the gas inlet 4 and combusted in the combustion chamber 3. Simultaneously, the piston 7 rotates the crankshaft 9 in the respective sets of bearings 11. The crankshaft 9, in turn, rotates the cam shaft 20. During the downstroke phase of the combustion cycle, the piston 7 pushes exhaust gases from the combustion chamber 3 and into the exhaust outlet chamber 5.

At approximately 10 degrees after top dead center on the combustion cycle, the cam shaft 20 rotates the lobe 49a of the cam 49 around to the lower end of the valve shaft 47 of the valve 46. The valve head 48 is therefore unseated from the opening 51, thus facilitating flow of high-pressure exhaust gases from the exhaust outlet chamber 5 and into the high pressure exhaust chamber 26. In the event that the pressure of the high pressure exhaust gases in the high pressure exhaust chamber 26 is sufficient to overcome the bias exerted against the valve shaft 32 by the spring 35 of the poppet valve 31, the valve head 33 is unseated from the opening 34. Therefore, high-pressure exhaust gases are capable of flowing from the high pressure exhaust chamber 26, through the opening 34 and into the steam reservoir 30, respectively. Simultaneously, liquid water is sprayed from the water injector 40, into the steam reservoir 30 and turns into high-pressure steam. The steam reservoir 30 distributes the high-pressure steam to a conventional PDX jet drive unit (not shown). In typical marine propulsion applications, the PDX jet drive unit is mounted beneath the hull of a watercraft (not shown) and is immersed in the body of water on which the watercraft floats. The PDX jet drive unit includes a nozzle in which the enthalpy, or internal energy, of the steam from the steam reservoir 30 is converted into kinetic energy required for the fluid dynamic interaction with water from the water body; a mixing chamber in which the kinetic energy of the steam is transferred to the water from the water body; and a propulsion nozzle in which the kinetic energy or momentum of the steam/water mixture is maximized prior to being expelled into the water body.

When the pressure of the combustion gases in the high-pressure exhaust chamber 26 diminishes to a level below the bias exerted on the valve shaft 32 by the spring 35 in addition to the pressure in the steam reservoir 30, the poppet valve 31 closes, thereby preventing reverse flow of gases from the steam reservoir 30 to the high-pressure exhaust chamber 26. The valve 46 remains open as the piston 7 continues the downstroke power phase in the cylinder 12 as the piston 7 is pushed by the combustion gases remaining in the exhaust outlet chamber 5 and combustion chamber 3.

At approximately 180 degrees at top dead center of the combustion cycle, the cam shaft 20 rotates the cam lobe 59a of the cam 59 around to the valve shaft 57 of the valve 56, thus unseating the valve head 58 from the valve opening 61. This allows the low-pressure exhaust which remains in the high pressure exhaust chamber 26 to flow through the valve opening 61 and into the low-pressure exhaust chamber 27. The low pressure exhaust flows from the low-pressure exhaust chamber 27 and through the heat exchanger 28. As the low-pressure exhaust gases flow through the heat exchanger 28, heat is transferred from the low-pressure exhaust gases to the steam reservoir 30. This imparts additional heat to the high-pressure steam flowing through the steam reservoir 30. The low-pressure exhaust gases are then discharged from the heat exchanger 28 through a suitable exhaust outlet (not shown). The valve 46 and valve 56 remain open until the upward motion of the piston 7 in the cylinder 12 forces all of the exhaust gases from the combustion chamber 3 and through the high pressure exhaust chamber 26, low pressure exhaust chamber 27 and heat exchanger 28, respectively, allowing for normal 4-cycle action of the internal combustion engine 2 to continue. At approximately 360 degrees after top dead center of the combustion cycle, the valve 46 and valve 56 close, and the cycle is repeated.

While the preferred embodiments of the invention have been described above, it will be recognized and understood that various modifications can be made in the invention and the appended claims are intended to cover all such modifications which may fall within the spirit and scope of the invention.

The invention claimed is:

1. A steam-generating drive system comprising:
   an internal combustion engine having an exhaust outlet chamber;
   a steam reservoir provided in fluid communication with said exhaust outlet chamber for receiving exhaust gases from said exhaust outlet chamber;
   a water injector provided in fluid communication with said steam reservoir for injecting water into said steam reservoir;
   a high-pressure exhaust chamber between said exhaust outlet chamber and said steam reservoir;
   a heat exchanger provided in fluid communication with said high-pressure exhaust chamber and in thermal contact with said steam reservoir; and
   a first valve between said high-pressure exhaust chamber and said steam reservoir and a second valve between said exhaust outlet chamber and said high pressure exhaust chamber.

2. The steam-generating drive system of claim 1 further comprising a heat exchanger provided in fluid communication with said exhaust outlet chamber and in thermal contact with said steam reservoir.

3. The steam-generating drive system of claim 1 further comprising a water pump coupled to said internal combustion engine and provided in fluid communication with said water injector.

4. The steam-generating drive system of claim 1 further comprising a valve between said high-pressure exhaust chamber and said steam reservoir.

5. The steam-generating drive system of claim 1 further comprising a third valve between said high-pressure exhaust chamber and said heat exchanger.

6. The steam-generating drive system of claim 5 further comprising a cam shaft engaged for rotation by said internal combustion engine and a first cam carried by said cam shaft and engaging said second valve and a second cam carried by said cam shaft and engaging said third valve.

7. A steam-generating drive system comprising:
   an internal combustion engine having an exhaust outlet chamber;
   a high pressure exhaust chamber provided in fluid communication with said exhaust outlet chamber;
   a steam reservoir provided in fluid communication with said high pressure exhaust chamber;
   a water injector provided in fluid communication with said steam reservoir for injecting water into said steam reservoir;
   a low pressure exhaust chamber provided in fluid communication with said high pressure exhaust chamber; and
   a first valve between said high-pressure exhaust chamber and said steam reservoir and a second valve between said exhaust outlet chamber and said high pressure exhaust chamber.

8. The steam-generating drive system of claim 7 further comprising a heat exchanger provided in fluid communication with said low pressure exhaust chamber and in thermal contact with said steam reservoir.

9. The steam-generating drive system of claim 7 further comprising a water pump coupled to said internal combustion engine and provided in fluid communication with said water injector.

10. The steam-generating drive system of claim 7 further comprising a valve between said high-pressure exhaust chamber and said steam reservoir.

11. The steam-generating drive system of claim 10 wherein said valve comprises a valve shaft, a valve head carried by said valve shaft and a spring normally biasing said valve head in a sealing position between said high-pressure exhaust chamber and said steam reservoir.

12. The steam-generating drive system of claim 7 further comprising a third valve between said high-pressure exhaust chamber and said heat exchanger.

13. The steam-generating drive system of claim 12 further comprising a cam shaft engaged for rotation by said internal combustion engine and a first cam carried by said cam shaft and engaging said second valve and a second cam carried by said cam shaft and engaging said third valve.

14. A steam-generating drive system comprising:
    an internal combustion engine having an exhaust outlet chamber;
    a high pressure exhaust chamber provided in fluid communication with said exhaust outlet chamber;
    a steam reservoir provided in fluid communication with said high pressure exhaust chamber;
    a water injector provided in fluid communication with said steam reservoir for injecting water into said steam reservoir;
    a low pressure exhaust chamber provided in fluid communication with said high pressure exhaust chamber; and
    a first valve between said high-pressure exhaust chamber and said steam reservoir, a cam-actuated second valve between said exhaust outlet chamber and said high pressure exhaust chamber and a cam-actuated third valve between said high pressure exhaust chamber and said low pressure exhaust chamber.

15. The steam-generating drive system of claim 14 further comprising a heat exchanger provided in fluid communication with said low pressure exhaust chamber and in thermal contact with said steam reservoir.

16. The steam-generating drive system of claim 14 further comprising a water pump coupled to said internal combustion engine and provided in fluid communication with said water injector.

* * * * *